(12) United States Patent
Bernard et al.

(10) Patent No.: US 6,601,448 B1
(45) Date of Patent: Aug. 5, 2003

(54) RESISTIVE WIRE MASS FLOW METERS

(75) Inventors: Marc Bernard, Saint-Florent-sur-Cher (FR); Cyril Barre, Bourges (FR)

(73) Assignee: Auxitrol S.A. (FR)

( * ) Notice: Subject to any disclaimer, the term of this patent is extended or adjusted under 35 U.S.C. 154(b) by 0 days.

(21) Appl. No.: 09/979,606

(22) PCT Filed: May 10, 2000

(86) PCT No.: PCT/FR00/01254

§ 371 (c)(1),
(2), (4) Date: Feb. 20, 2002

(87) PCT Pub. No.: WO00/68650

PCT Pub. Date: Nov. 16, 2000

(30) Foreign Application Priority Data

May 11, 1999 (FR) .............................................. 99 05986

(51) Int. Cl.[7] .................................................. G01F 1/68
(52) U.S. Cl. .................................................... 73/204.11
(58) Field of Search ........................ 73/204.11, 204.14, 73/204.21, 204.27, 204.25, 861.95, 170.02, 170.12

(56) References Cited

U.S. PATENT DOCUMENTS

| 3,363,463 | A | * | 1/1968 | Wheeler | .................. | 73/204.11 |
| 4,501,145 | A | | 2/1985 | Boegli et al. | .................. | 73/204 |
| 4,604,895 | A | * | 8/1986 | Watkins | .................... | 73/204.11 |

FOREIGN PATENT DOCUMENTS

| EP | 0070801 | 1/1983 | .......... G01N/25/18 |
| EP | 0210509 | 2/1987 | ............. G01F/1/68 |
| FR | 2680872 | 3/1993 | ............. G01K/3/02 |
| WO | 89/01132 | 2/1989 | |

* cited by examiner

*Primary Examiner*—Hezron Williams
*Assistant Examiner*—C Dickens
(74) *Attorney, Agent, or Firm*—Blakely, Sokoloff, Taylor & Zafman

(57) ABSTRACT

The invention concerns a mass flow meter comprising at least a resistive wire (1 or 2) placed in the path of a fluid whereof the flow rate is to be measured, means (30) for applying to the wire current pulses, measuring means for determining the cooling speed of the wire between said pulses. The invention is characterised in that it comprises means for determining, on the basis of at least one measurement of the cooling speed, the type of fluid on the path of which the resistive wire is arranged.

7 Claims, 4 Drawing Sheets

RESISTIVE WIRE MASS FLOW METERS

BACKGROUND

1. Field of the Invention

The present invention relates to resistive wire mass flow meters.

More precisely, the invention relates in particular to mass flow meters intended to be used for measuring the flow of kerosene, for example in aircraft.

2. Description of the Related Art

The applicant has already proposed, in his patent application FR-2.728.071, a hot wire flow meter for measuring a mass flow.

In it, current pulses are sent along the resistive wire for given periods and the cooling speed of the wire between the pulses is measured.

The flow meter comprises processing means which convert the cooling speed thus measured and derive the mass flow from it.

For a given type of fluid, the cooling speed is in fact directly related to the mass flow.

SUMMARY

There are however many types of kerosene likely to be used indiscriminately by a same aircraft.

Now, because of their difference in viscosity, their difference in heat conductivity or even their difference in voluminal mass, these different types of kerosene exhibit cooling responses, as a function of the mass flow, which are not identical.

A purpose of the invention is to propose a mass flow meter which is capable of carrying out measurements of mass flow for any type of kerosene by adapting itself to the type of kerosene which is flowing in the pipe in which it makes a measurement.

From EP 210 509 there is already known a measuring device making it possible to determine the mass flow of a fluid and also making it possible, in an independent manner, to determine the composition of the fluid when its speed is known.

This device does not make it possible to solve said problem.

The invention, however, proposes a mass flow meter of the type comprising at least one heating resistive wire placed in the path of a fluid whose flow is to be measured, means of applying heating current pulses to said wire, measuring means for determining its cooling speed between said pulses and for deriving a mass flow from it, characterized in that it comprises two such resistive wires that extend in two fluid passage zones in which the cross sections of said passages being in a given ratio and in that it comprises processing means capable, on the one hand, of determining mass flow measurements for each of said two wires and, on the other hand, of comparing the ratio of the measurements obtained for each of the two resistive wires with a theoretically expected ratio dependent on the given ratio between the passage cross sections, the processing means being capable of deriving from this comparison and from at least one of the measured cooling speeds on the one hand the type of fluid flowing and on the other hand the mass flow of the fluid.

Advantageously, the fluid passage zones are a hollow body in which the fluid flows and a branch which is a diversion with respect to said hollow body.

Preferably, the mass flow meter comprises a profiled body of the aircraft wing type and in that an opening traverses said profiled body, a metal heating wire extending along the length of this opening, the shape of said opening and the incidence of said profiled body in the flow of fluid being such that the boundary layer and the flow to be measured penetrate into said opening in such a way as to avoid or reduce the impacts of particles on the wire.

The invention advantageously applies in particular when the fluid is kerosene, the processing means being capable of deriving the type of kerosene flowing from the comparison used.

BRIEF DESCRIPTION OF THE DRAWINGS

Other characteristics and advantages of the invention will furthermore emerge from the following description.

This description is purely illustrative and non-limitative. It must be read with reference to the accompanying drawings in which.

DETAILED DESCRIPTION

Figure 1:
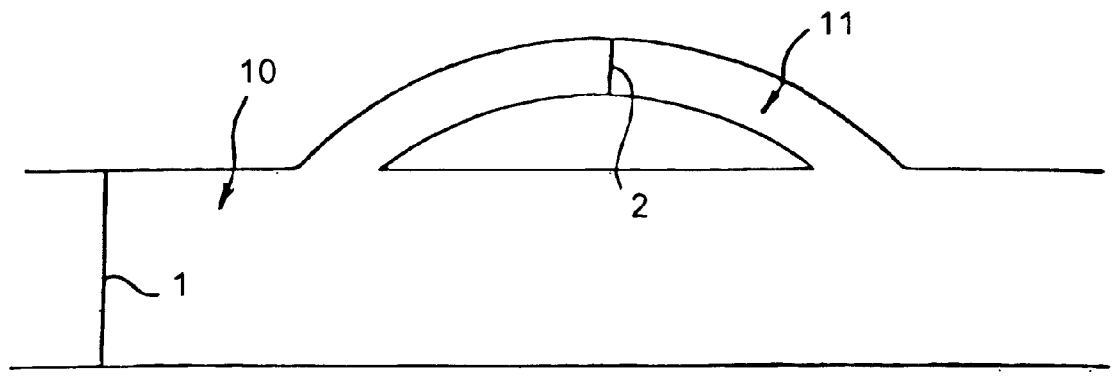
FIG. 1 is diagrammatic representation in cross section of a flow meter according to one embodiment of the invention, seen in vertical axial cross section, of a hot wire mass flow meter.

The mass flow meter which is shown in FIG. 1 comprises, on the one hand, a main hollow body 10 of generally cylindrical shape in which flows the fluid whose mass flow is to be measured and, on the other hand, a diversion branch 11 which extends in parallel with a portion of said hollow body 10.

It also comprises two resistive wires 1 and 2 which extend diametrically, one of them (wire 1) in a portion of the hollow body 10 upstream or downstream of the diversion 11 and the other (wire 2) in the diversion 11 itself.

Wire 1 is the main measuring wire.

Wire 2 is a reference wire.

These two wires 1 and 2 are connected to a same management unit 30 which controls the generation of current pulses in the wire 1 and the wire 2 and measures the cooling speeds of said wires 1 and 2 in the way described below in a detailed manner.

The management unit 30 also comprises storage means in which are stored data allowing it, for each type of kerosene, to convert the determined cooling speed into a mass flow value.

Now, the mass flows measured in the main hollow body 10 by means of the resistive wire 1 and in the diversion branch 11 by means of the resistive wire 2 must be in a given ratio, imposed by construction and in particular by the ratio of the passage cross sections in the body 10 and the branch 11.

The management unit 30 comprises processing means which allow it to determine, on the basis of the cooling speeds measured for wire 1 and for wire 2, which is the kerosene for which the mass flow values determined on the basis of said conversion data and corresponding to these cooling speeds are actually in the expected ratio.

Thus, it is possible at any time for the management unit 30 to determine what type of kerosene (JET A, also called JP8; JET B, also called JP4; JP1; JP3; JP5; etc.) is flowing in the body 10 and the diversion branch 11.

This determination of the type of kerosene can for example be made at regular intervals by the management unit 30 during the flight of an aircraft.

As a variant, the management unit 30 can check, for each measurement, that the mass flows determined on the basis of the cooling speeds of wire 1 and of wire 2 are correctly in the expected ratio and can make a new determination of the type of fluid flowing in the body 10 and the diversion branch 11 when this ratio is not complied with.

The mountings of the wires 1 and 2 and the measuring processes used by the management unit 30 are of the type described in the applicant's patent application FR-2.728.071, which can be referred to advantageously.

Figure 2A:
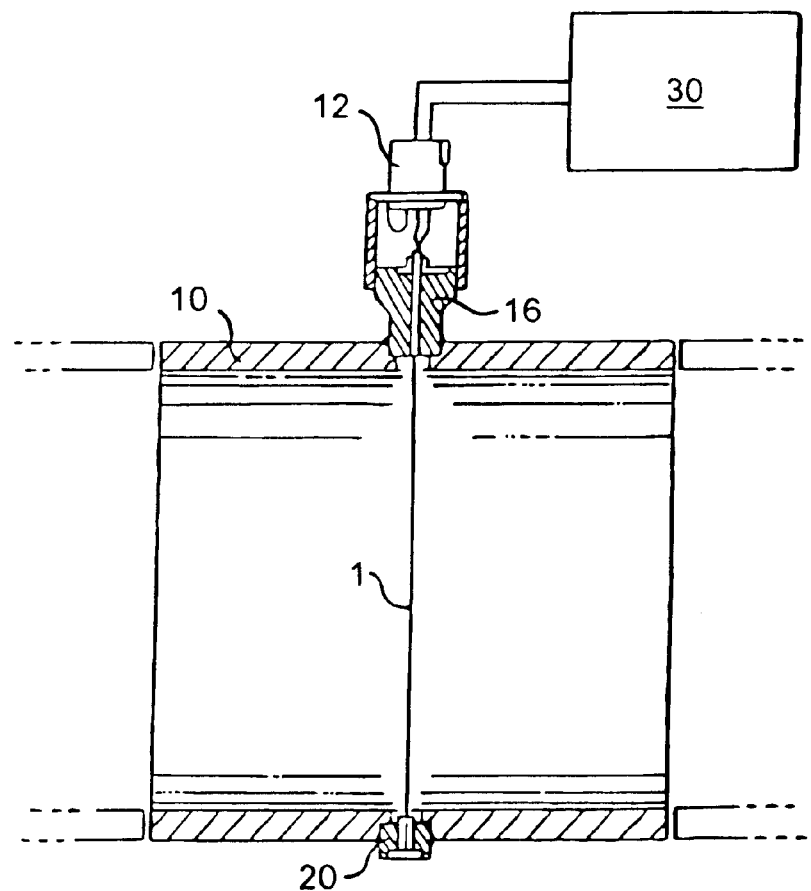
FIG. 2 is a diagrammatic representation illustrating the fitting of a resistive wire.
Figure 2B:
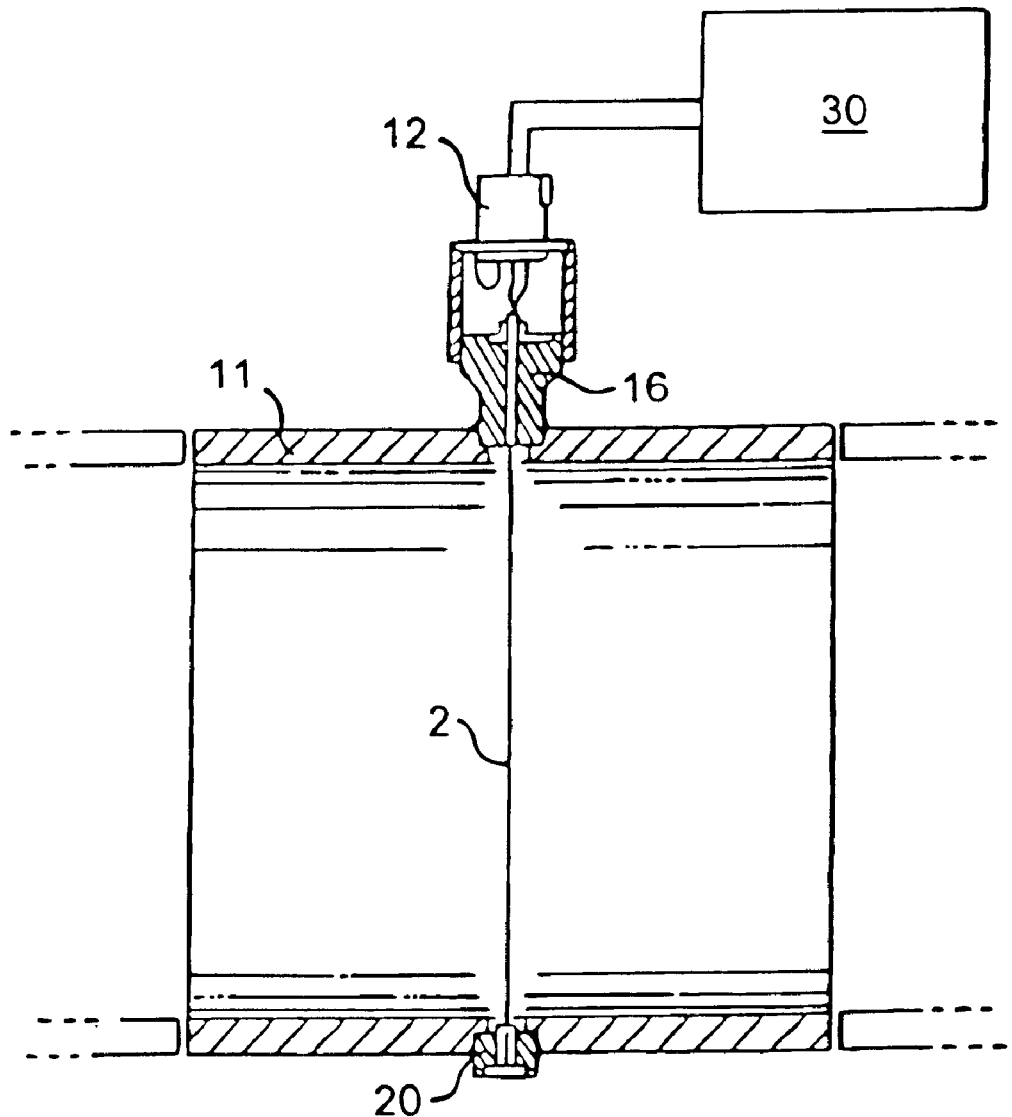
Figure 3A:
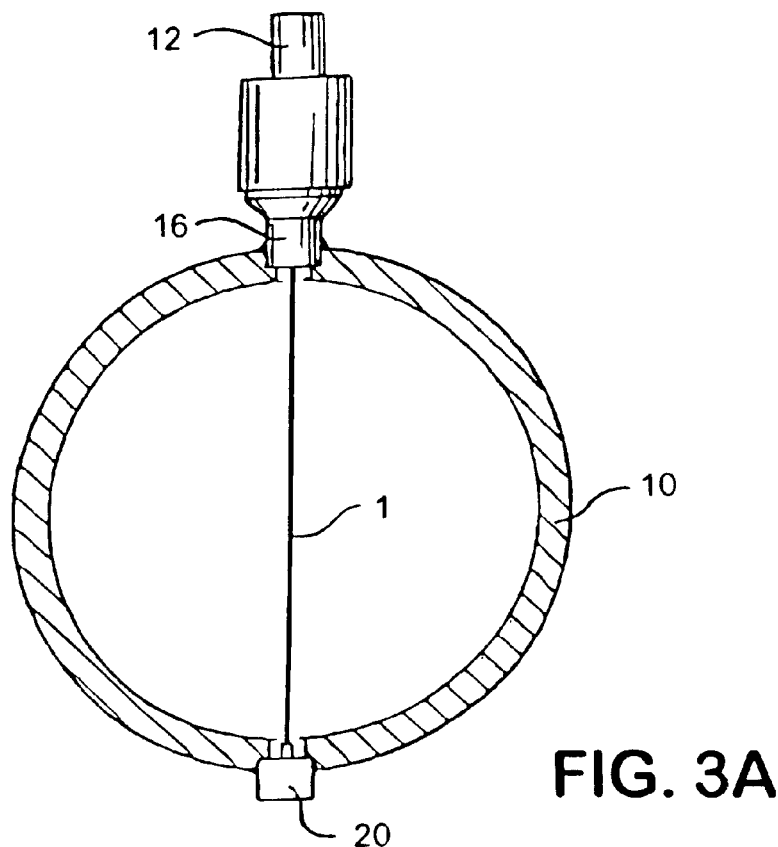
FIG. 3 is a transverse cross-sectional view of the assembly shown in FIG. 2.
Figure 3B:
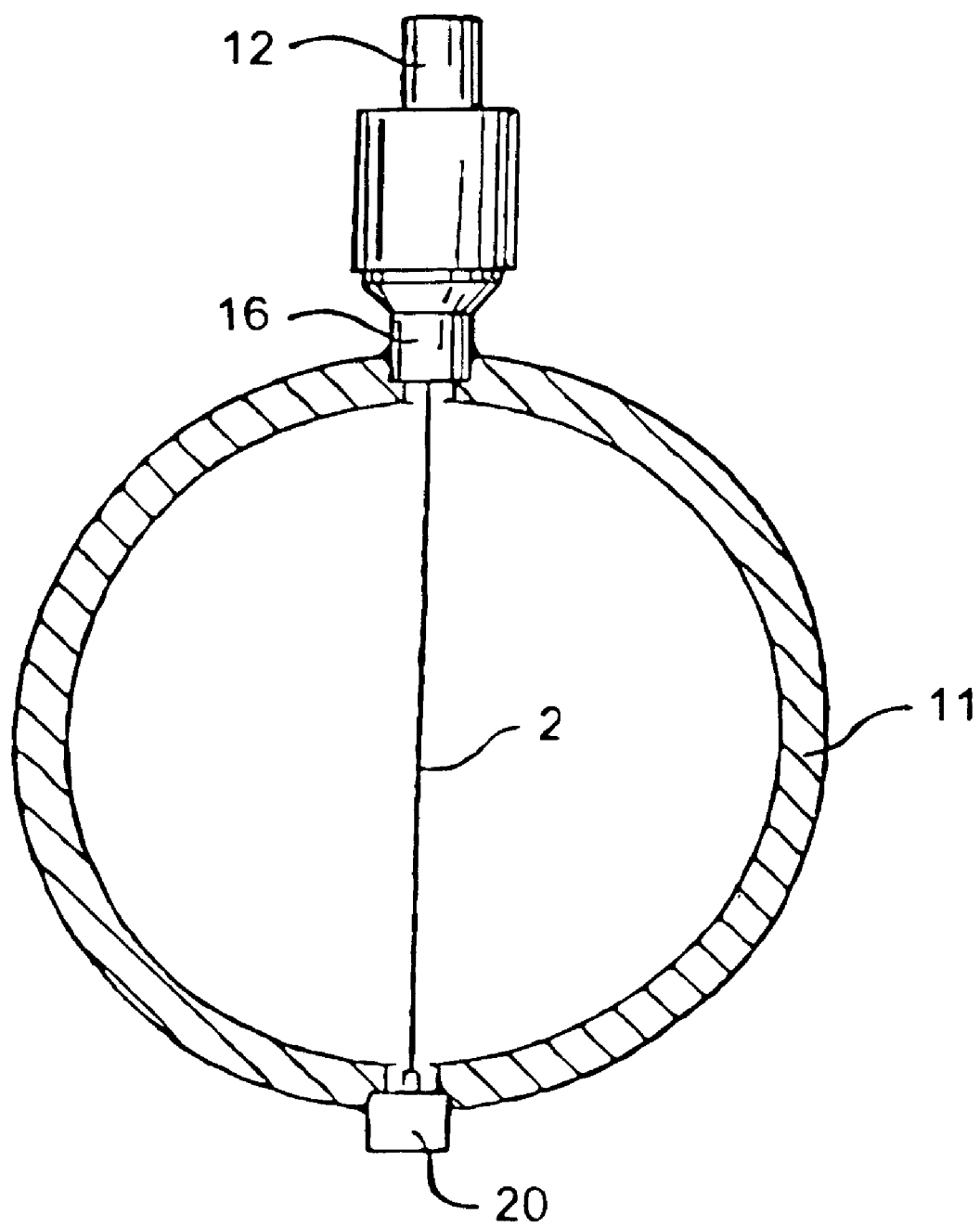

They are recalled below with reference to FIGS. 2 and 3.

The resistive wires 1 and 2 are, for example, constituted by a resistive conductor bent through 180° at its bottom end and extending doubled inside a cover.

The bottom end of said wire 1 or 2 is crimped in a cylindrical ring 20 welded in a drilling in the body 10 or in its branch 11.

At its top end, the resistive wire traverses, in an electrically insulated manner, a central bore of a mount 16 fixed in another drilling in the body 10 or in the branch 11 by welding, said wire 1 or 2 being fixed to said mount 16. On said mount there is fitted a connector 12 for connecting said wire 12 to the electronic processing unit 30.

In operation, a heating of the resistive wire 1 or 2 is established by applying well-determined current pulses to it and the slope of the cooling curve of the wire is examined when, between the successive pulses, only a weak, insignificant current is passing through it.

Knowledge of this slope allows the processing unit 30 to calculate the mass flow of the fluid, said slope in fact being directly dependent on said mass flow.

The electronic circuit of the flow meter is designed so that the control unit 30 can know at all times, on the one hand, the voltage U across the terminals of the wire 1 or 2 and, on the other hand, the current I which is passing through it. The instantaneous value of its resistance R=U/I is derived from it and therefore the instantaneous value of its temperature, the resistance varying as a function of temperature according to a monotonic law which is previously known.

Due to the fact that the measurement is made by determination of a slope (a differential measurement), the flow meter does not require any reference, unlike the majority of the previously known systems.

Thus, the flow meter is not sensitive to variations in the temperature of the fluid whose flow is to be measured.

The processing unit 30 comprises means timed to apply current pulses to the wire with the same constant value of current each time, according to a well determined cyclic ratio. It also comprises means capable, during each period separating two successive current pulses, of acquiring the temperature of the wire by measuring its resistance. In order to be able to make this measurement, it is necessary to cause a very weak constant current to flow in the wire, the value of this current being chosen such that it does not influence the thermal behavior of the wire during its cooling. For example, the current is chosen such that a power of a few milliwatts is dissipated, in comparison with several tens of watts during the actual current pulses. Thus the temperature of the wire during its cooling is directly proportional to the voltage across its terminals.

The unit 30 comprises a circuit for differentiating this voltage as a function of time. The derivative thus obtained is a function of the mass flow and the processing unit 30 comprises conversion means which determine the mass flow as a function of the derivative of the voltage. For example, the unit 30 comprises storage means in which conversion tables are stored.

According to another advantageous aspect of the invention, the wires 1 and 2 of the flow meter can be received inside a profile of the type that was described in the applicant's patent application FR 91 10845 to which it will be possible to refer advantageously.

Figure 4:
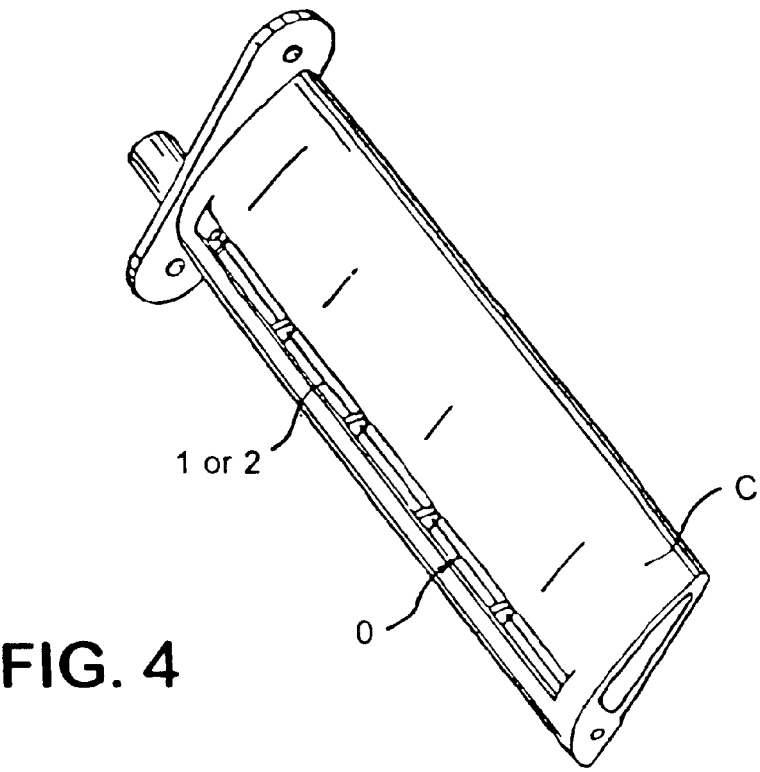
FIG. 4 is a diagrammatic representation in perspective of a profiled body in which the wire of a flow meter according to the invention can be received.

Such a profiled body has been shown in FIG. 4 in which it has been referenced by C. It has a shape like an aircraft wing which can be symmetrical or not symmetrical.

An opening O traverses said profiled body C, the metal wire extending along the length of this opening.

The shape of said opening O and the incidence of said profiled body C in the flow of fluid being such that the boundary layer and the flow to be measured penetrate into said opening O in such a way as to avoid or reduce the impacts of particles, liquid or solid particles in the case of a gaseous fluid, solid particles in the case of a liquid fluid.

The mass flow meter which has just been described is particularly advantageous in the case of making measurements for kerosene, especially in the case of supplying an aircraft engine or turbine.

The invention could however be applied to other types of fluids.

What is claimed is:

1. A mass flow meter for determining a mass flow of a fluid flowing in a conduit having two different fluid passage zones, comprising:

at least two heating resistive wires disposed in the two different fluid passage zones of the conduit in which cross sections of the passage zones are in a defined ratio;

applying means for applying heating current pulses to said wires;

measuring means for determining cooling speed of the wires between said pulses; and processing means for (1) determining mass flow measurements for each of said two wires, (2) comparing the ratio of the measurements obtained for each of the two resistive wires with a theoretically expected ratio dependent on the defined ratio between the passage cross sections, and (3) deriving, based on the comparison and based on at least one of the measured cooling speeds, (a) a type of fluid flowing and (b) the mass flow of the fluid.

2. The mass flow meter as claimed in claim 1, wherein the fluid passage zones are a hollow body in which the fluid flows and a branch which is a diversion with respect to said hollow body.

3. The mass flow meter as claimed in claim 1, wherein the two heating resistive wires are received inside a profiled body of an aircraft wing type, wherein an opening traverses said profiled body, at least one of the heating resistive wires extending along the length of said opening, the shape of said opening and the incidence of said profiled body in the flow of fluid being such that the boundary layer and the flow to be measured penetrate into said opening in such a way as to avoid or reduce the impacts of particles on the wire.

4. The mass flow meter as claimed in claim 1, wherein the fluid is kerosene, the processing means being capable of deriving the type of kerosene flowing from the comparison used.

5. The mass flow meter as claimed in claim 1, wherein the processing means is adapted for measuring the mass flow of kerosene in an aircraft.

6. A mass flow meter for determining a mass flow of a fluid flowing in a conduit, the conduit having a first fluid passage and a second fluid passage, cross sections of the first and second passages being in a first ratio, comprising:

a first wire disposed in the first fluid passage;

a second wire disposed in the second fluid passage; and a unit coupled to the first and second wires, said unit configured (1) to apply heat to the first and second wires, (2) to measure cooling speed of the first and second wires, (3) to determine mass flow measurements for each of the wires, (4) to determine (a) a type of fluid flowing and (b) the mass flow of the fluid, based on the mass flow measurements for each of the wires and at least one of the measured cooling speed.

7. The mass flow meter as claimed in claim 6, wherein the type of fluid flowing is determined further based on the first ratio.

* * * * *